United States Patent [19]
Burdi et al.

[11] 3,924,232
[45] Dec. 2, 1975

[54] OPTICAL WARNING SYSTEM
[75] Inventors: Aldo J. Burdi, Sunnyvale; Robert S. Congleton, Newark, both of Calif.
[73] Assignee: Itek Corporation, Lexington, Mass.
[22] Filed: Aug. 26, 1974
[21] Appl. No.: 500,222

[52] U.S. Cl. ................ 343/6 R; 343/18 E; 250/199
[51] Int. Cl.² .......................................... G01S 7/36
[58] Field of Search ............ 343/6 R, 18 E; 250/199

[56] References Cited
UNITED STATES PATENTS
3,714,654  1/1973  Wicks et al. ...................... 343/18 E
3,716,853  2/1973  LaFollette ...................... 343/18 E X

*Primary Examiner*—T. H. Tubbesing
*Attorney, Agent, or Firm*—Homer O. Blair; Robert L. Nathans

[57] ABSTRACT

A system for retrofitting the radar electronics in aircraft to allow the same electronics to process received optical signals. An optical sensor package and an optical data processor are placed in the aircraft adjacent to existing radar antennas and preamplifiers. Received optical signals are tested for pre-determined parameters by the optical data processor, and the optical data is transformed to simulated radar signals and introduced into the radar preamplifier. The signals are then processed as typical radar signals and displayed on the cathode ray tube and threat display unit in front of the pilot. The signals are modulated to indicate to the pilot that the signals being displayed are from optical rather than radar threats.

4 Claims, 3 Drawing Figures

OPTICAL WARNING SYSTEM

BACKGROUND OF THE INVENTION

The present invention relates generally to systems for alerting the pilot of an aircraft as to types of signals illuminating the aircraft, and more particularly pertains to a new and improved system for retrofitting radar equipment on aircraft to allow the same equipment to process illumination from optical sources such as lasers. Many aircraft already in service have electronics for processing received radar signals and alerting the pilot as to the types of signals illuminating the aircraft. With the development of weapons and systems based on laser technology, it would be desirable to add the capability of detecting and processing optical radiation without a major addition to or overhaul of existing equipment in the aircraft, and without having to rewire the aircraft to add additional wiring running from the optical detectors to the equipment by the pilot which processes and displays the optical signals. Rewiring the aircraft in such a manner would be an extremely expensive solution to the problem.

SUMMARY OF THE INVENTION

In accordance with a preferred embodiment, a system is disclosed for allowing the addition of an optical detecting and processing capability to an aircraft with only a small number of additional components and without substantial rework of the aircraft. These features are extremely important as space is very limited in a typical aircraft, and there is simply not sufficient space for the addition of a major new system. Also, if the aircraft and its wiring had to be substantially reworked the cost might be economically prohibitive. The present invention overcomes these problems by sharing much of the equipment already in the aircraft which is utilized for the processing of radar signals.

In the preferred embodiment an optical detector system detects optical radiation of interest illuminating the aircraft. The received optical signals are analyzed for selected parameters. If those parameters are present, electrical signals are generated having predetermined characteristics of radar signals so that the generated signals will be passed by particular filtering circuits within the radar processor. The display equipment of the pilot is responsive to those signals to inform the pilot that the aircraft is being illuminated by an optical signal.

DESCRIPTION OF A PREFERRED EMBODIMENT

Figure 1:
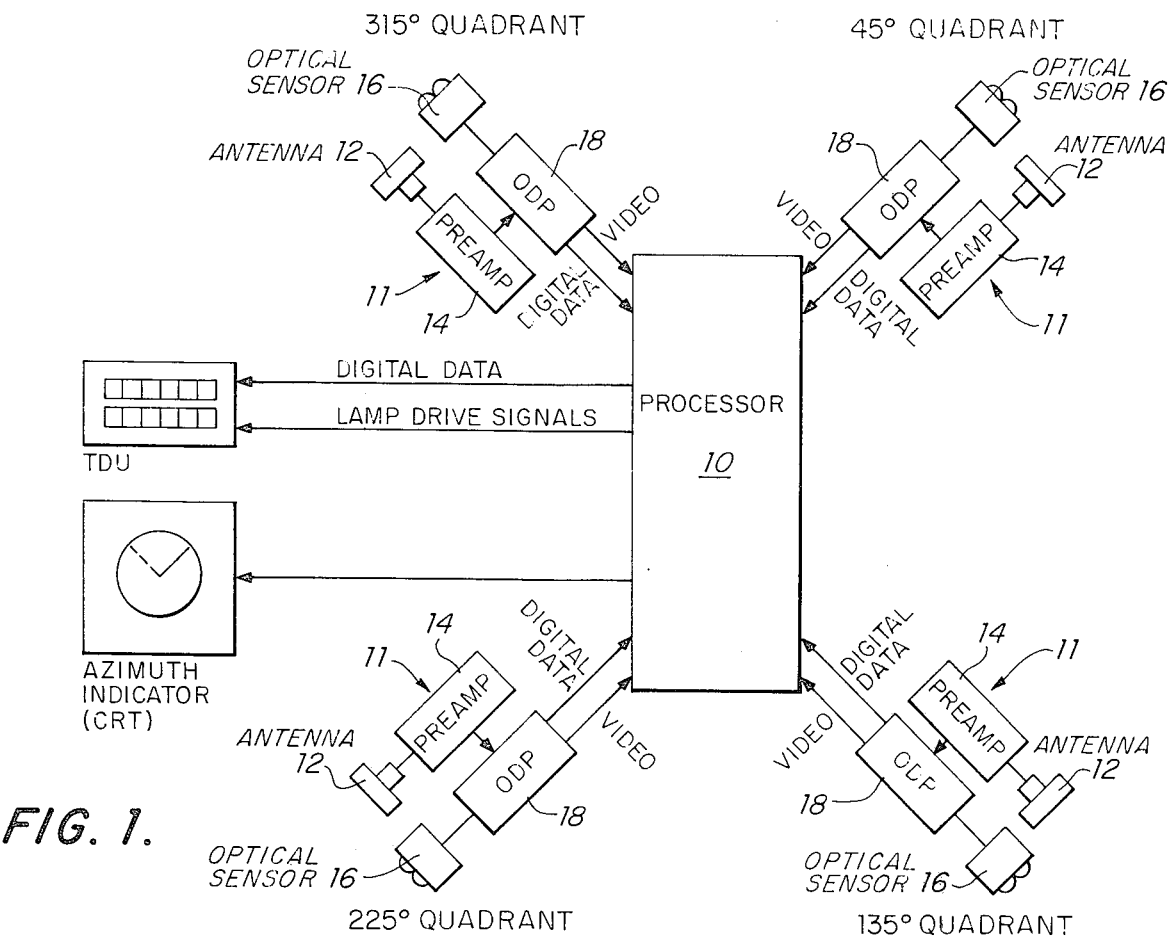
FIG. 1 illustrates an electronic block diagram of a preferred embodiment for processing both received radar and optical signals in an aircraft.

Referring to FIG. 1, there is shown an overall block diagram of the electronics in an aircraft for processing received radar signals, and the add-on electronics for also processing received optical signals as taught by Applicant's invention. Referring to that figure, many aircraft already in service have a radar processor 10 which receives electrical signals representing radar signals which illuminate the aircraft. The processor receives these electrical signals from several sectional radar channels 11. Typically an aircraft has four radar antennas on it, each of which picks up radar signals from a different direction. The several sectional radar channels inform the pilot of the general direction from which the radar illumination is being received. In each radar sectional channel, an antenna 12 picks up illuminating radar signals and directs those signals to a preamplifier 14 which is located adjacent to the antenna. The preamplifier 14 detects, cleans and amplifies the signals and directs them to the central radar processor 10. The radar processor 10, which may be a model ARL-45 or APR-36 processor unit produced by Itek Corporation, has a plurality of filtering circuits in it which filter the incoming radar pulse trains according to several parameters such as the amplitude of the pulses in the train, the pulse repetition frequency of each train, and the pulse width of each pulse in the train. The parameters of each of the filtering circuits are known.

Referring back to FIG. 1, optical sensor packages 16 are added to the aircraft in close proximity to each radar antenna 12. Each sensor package produces signals indicative of received optical radiation, and directs them to an optical data processor 18. The optical data processor 18 checks the signals for certain parameters, as will be explained later, and if those parameters are present it produces a pulse train having characteristics similar to those of a radar threat emitter. The pulse train will have characteristics to pass predetermined filter circuits within the radar processor 10. The passage of the pulse train by the filter circuits will cause a display on the cathode ray tube (CRT) and threat display unit (TDU) in front of the pilot in a manner, as will be explained, to alert the pilot that the aircraft is being illuminated by given types of optical radiation.

Figure 2:
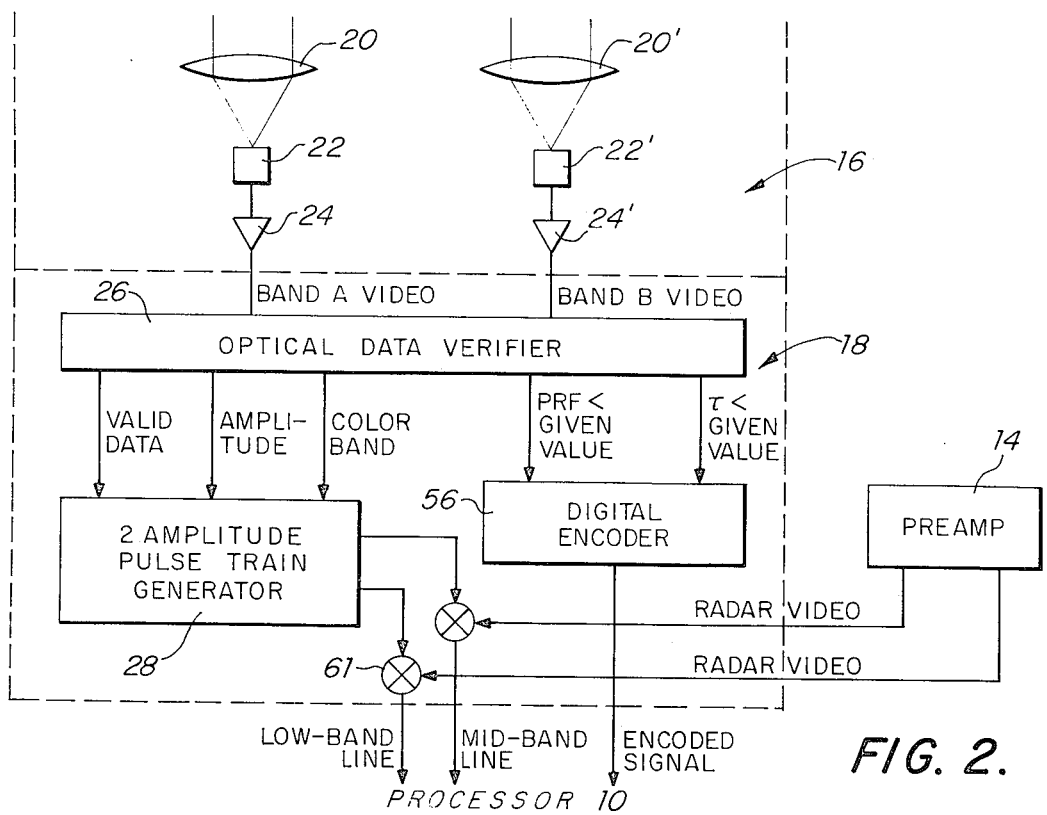
FIG. 2 is a block diagram giving further details of the optical data processor shown in block form in FIG. 1.

FIG. 2 illustrates further details of the optical sensor package and the optical data processor. The optical sensor package per se does not form a part of this invention, but would include an optical system 20 to receive radiation from the field of interest, a detector 22 and at least one preamplifier stage 24. The optical sensor package may be a system as illustrated in U.S. Pat. No. 3,761,184 for Wide Angle, Narrow Bandwidth Laser Detection System, or may be another design. The preamplifier might be a low noise video type with approximately 10 DB gain per stage and an impedance to match that of the coaxial cable it drives. The coaxial cable which connects the sensor package to the optical data processor should be as short as aircraft physical constraints will allow, and might possibly be eliminated by a judicious placement of components in the system. In the preferred embodiment the sensor package includes two detectors 22 and 22', each of which detects optical radiation from different portions of the spectrum, designated respectively as Band A Video and Band B Video. The signals from the sensor 16 are directed to an optical data verifier 26 within the processor 18. The function of the optical data verifier is to determine the characteristics of the signals and verify the presence of an optical threat. Once the optical threat has been verified, a controlled parameter pulse train generator 28 is turned on, and its output is directed to the radar processor 10 in a manner as will be explained later.

Figure 3:
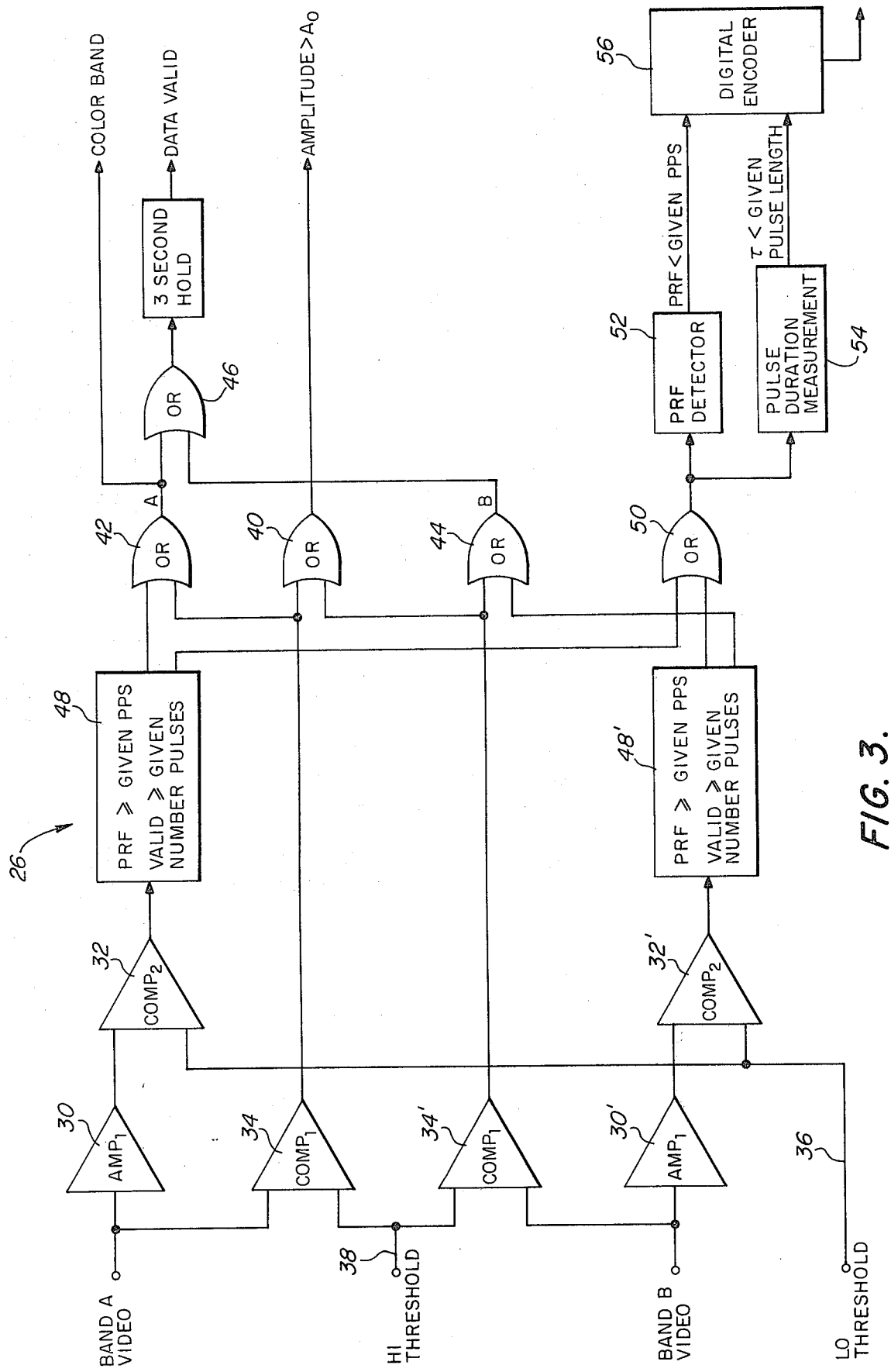
FIG. 3 is a block diagram of the optical data verifier shown in block form in FIG. 2.

FIG. 3 illustrates further details of the optical data verifier 26. Referring to that figure, the incoming Band A and Band B Video are amplified respectively by amplifiers 30 and 30' and then directed respectively to low threshold comparators 32 and 32'. The Band A Video and Band B Video are also respectively connected directly to high threshold amplitude comparators 34 and 34'. The thresholds of low amplitude 32 and 32' and high amplitude comparators 34 and 34' are externally adjustable by control signals respectively on lines 36 and 38. Each of the comparators might be a standard comparator circuit which compares the amplitude of an input signal with the amplitude of a reference signal and passes the input signal if its amplitude is greater than that of the reference signal. The externally adjustable high and low amplitude threshholds add further control and flexibility to the system in dense or noisy environments. The value of the low and high threshold reference signals are set in accordance with the particular environment in which the system will function. The outputs of both high amplitude comparators are directed to an OR gate 40, the output of which, termed "amplitude," will be utilized as explained later. The outputs of the high threshold comparators 34 and 34' are also connected respectively to OR gates 42 and 44, the outputs of both of which are directed to a further OR gate 46. The net result of the arrangement of OR gates 42, 44, and 46 is that if either of comparators 34 or 34' produce an output, OR gate 46 will be triggered to establish a "valid data" condition.

A valid data condition may also be established by Band A or Band B video passing through the low threshold amplitude comparators as follows. The outputs of the low threshold comparators 32 and 32' are directed respectively to pulse filtering circuits 48 and 48'. These pulse filtering circuits may be standard circuits, and pass an input signal if three or more consecutive pulses are received having a pulse repetition frequency greater than some particular value. If pulses meeting this criteria are received, the filtering circuits 48 and 48' will pass outputs respectively to OR gates 42 and 44. The outputs of either one of these OR gates will trigger OR gate 46 to also establish a valid data condition. A separate output signal termed "color band" is taken at the output of OR gate 42. A color band output indicates that the valid data condition is caused by an input of Band A Video. The absence of a color band output indicates that the valid data condition is caused by Band B Video.

The outputs of pulse filtering circuits 48 and 48' are also directed to a further OR gate 50 which directs its output to two additional circuits 52 and 54 which test the pulse trains to determine if the pulse repetition frequency is less than a given number of pulses per second and if the pulse duration is less than some predetermined value. Circuits 52 and 54 may be standard circuits, known and available in the art, which accomplish those functions. The signals from circuits 52 and 54 are digitally encoded by an encoder 56 before being directed to the threat display unit. The five outputs from the optical data verifier circuit 26 are utilized as follows.

A valid data signal indicates that an optical thread has been verified, and, referring back to FIG. 2, it energizes a two amplitude pulse train generator 60. The amplitude signal from the optical data verifier indicates whether the received optical signal has an amplitude greater than the high threshold level. Depending upon which amplitude threshold level is surpassed, the generator 60 produces either a low amplitude or a high amplitude pulse train. The generated pulse trains have pulse repetition frequencies and pulse widths well within the "accept" limits of predetermined filters in the radar processor 10. The output of the generator 60 is coupled onto either a low-or a mid-band video line, depending upon the color band (Band A or Band B Video) of the received signal. The pulse trains then pass through predetermined filters within the radar processor 10 and are displayed on the CRT. The low and high amplitude pulse trains cause the CRT strobe vector to be either a short length strobe vector or a long length strobe vector. The circuits which cause the CRT strobe vector to be either a short or a long length strobe vector are already in the aircraft and are utilized to process and display radar signals similar to the signals produced by generator 60. As shown in FIG. 2, summing networks 61 are provided in each optical data processor 18 to allow the normal radar signals to be directed to the central processor 10.

The Band A Video on the low-band line and the Band B Video on the mid-band line are distinguished on the CRT display by different strobe vectors. In the preferred embodiment a six dot vector code is generated for color Band A and a dot dash vector code is generated for color Band B. The circuits to accomplish this are already in the aircraft, and display radar signals on the low-band line and the mid-band line with different strobe vectors.

The coded vector strobes for optical threads on the CRT are also distinguished from radar threats. In the preferred embodiment, a coded vector strobe resulting from an optical threat is blinked at a two per second rate whereas radar threats are displayed as steady vector strobes. In the preferred embodiment the blinking of the optical threat strobe is accomplished within the pulse train generator 60 which is turned on and off at a twice per second frequency.

The output of the digital encoder 56 which indicates PRF and pulse width, is directed by the processor 10 to the TDU. The TDU currently in many aircraft has spare indicator lamps which are not being utilized. Those spare indicator lamps may be utilized to display the narrow pulse and low PRF outputs.

The preferred embodiment tests the optical signals for certain parameters. In alternative embodiments the optical signals might be tested for other parameters.

While several embodiments have been described, the teachings of this invention will suggest many other embodiments to those skilled in the art.

I claim:

1. In an aircraft which has a radar antenna for receiving radar signals illuminating the aircraft and in which the received radar signals are directed to a radar processor, remote from the radar antenna, having a plurality of filtering circuits, each of which has predetermined characteristics to filter out particular radar signals having those characteristics, and in which the filtered signals are directed to a display unit for the pilot to inform the pilot as to the type of radar signals illuminating the aircraft, the improvement comprising a system for enabling optical signals, such as laser beams, which are illuminating the aircraft to be processed and displayed to the pilot to inform the pilot that the aircraft is being illuminated by such optical signals, and wherein the system may be implemented with a small number of additional components and without adding additional wiring to the aircraft running from the optical detector to the equipment for processing the optical signals and displaying them to the pilot, and comprising:

a. an optical detector means for detecting optical radiation of interest illuminating the aircraft and for producing a signal indicative of the received radiation;
 b. means, responsive to the signal from said optical detector means, for analyzing the signal to determine selected parameters of the illuminating optical beam;
 c. generator means, responsive to said analyzing means, for generating electrical signals having predetermined characteristics of radar signals such that the electrical signals will be passed by a particular filtering circuit within said radar processor; and
 d. said display unit being responsive to the passage of electrical signals by said particular filtering circuit to indicate to the pilot that the aircraft is being illuminated by an optical signal.

2. A system as set forth in claim 1 wherein said analyzing means includes means for determining whether the signals exceed predetermined amplitude thresholds.

3. A system as set forth in claim 1 wherein said optical detector means, said analyzer means and said generator means are located adjacent to a radar antenna and radar preamplifier on the aircraft, and the output of said generator means is coupled to said radar preamplifier.

4. A system as set forth in claim 1 and wherein said generator means includes means for marking the generated electrical signals to differentiate them from radar signals, whereby the display unit will inform the pilot that the aircraft is being illuminated by an optical rather than a radar threat.

* * * * *